(12) United States Patent
Latham, II et al.

(10) Patent No.: US 8,159,205 B1
(45) Date of Patent: Apr. 17, 2012

(54) INDUCTOR CURRENT MEASUREMENT FOR DC TO DC CONVERTERS

(75) Inventors: Paul Walker Latham, II, Lee, NH (US); Mansur Kiadeh, Cupertino, CA (US); Stewart Gall Kenly, Epping, NH (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 12/959,456

(22) Filed: Dec. 3, 2010

(51) Int. Cl.
*G05F 1/00* (2006.01)

(52) U.S. Cl. .................. 323/286; 323/285; 323/284

(58) Field of Classification Search .......... 323/282, 323/284, 285, 286, 290; 327/559
See application file for complete search history.

(56) References Cited

U.S. PATENT DOCUMENTS

| | | | | |
|---|---|---|---|---|
| 4,315,316 A * | 2/1982 | Boros et al. | | 702/64 |
| 5,539,354 A * | 7/1996 | Carsten | | 327/559 |
| 5,602,464 A * | 2/1997 | Linkowsky et al. | | 323/272 |
| 5,982,160 A * | 11/1999 | Walters et al. | | 323/282 |
| RE38,780 E * | 8/2005 | Hawkes et al. | | 323/282 |
| 7,106,035 B2 * | 9/2006 | Xing | | 323/282 |
| 7,141,940 B2 * | 11/2006 | Ortiz | | 315/291 |
| 7,358,710 B2 * | 4/2008 | Luo et al. | | 323/282 |
| 7,439,721 B2 * | 10/2008 | Weng et al. | | 323/286 |
| 7,511,472 B1 * | 3/2009 | Xia et al. | | 324/142 |
| 2009/0267580 A1 * | 10/2009 | Derksen | | 323/282 |
| 2010/0131219 A1 | 5/2010 | Kenly et al. | | |

* cited by examiner

*Primary Examiner* — Gary L Laxton
*Assistant Examiner* — Zekre Tsehaye

(57) ABSTRACT

A system includes an averaging module, a high pass filter module, a first estimation module, a sensing module, and a combining module. The averaging module receives an output voltage of a power supply and that generates an average output voltage. The high pass filter module receives an average switching voltage used to control switches in an output stage of the power supply and filters a difference between the average output voltage and the average switching voltage. The estimation module estimates a first filtered current through an inductor in the output stage based on an output of the high pass filter module. The sensing module senses voltage across the inductor and estimates a second current through the inductor. The low pass filter module filters the second current. The combining module combines the first filtered current and the second filtered current to generate an estimated current through the inductor.

15 Claims, 11 Drawing Sheets

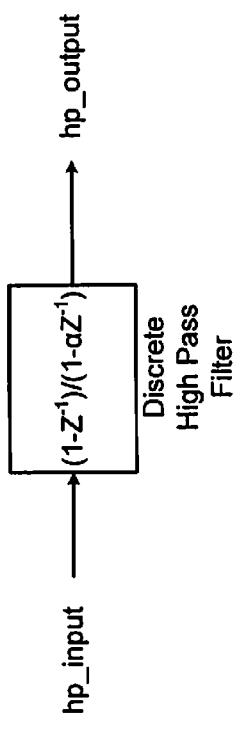
FIG. 6A
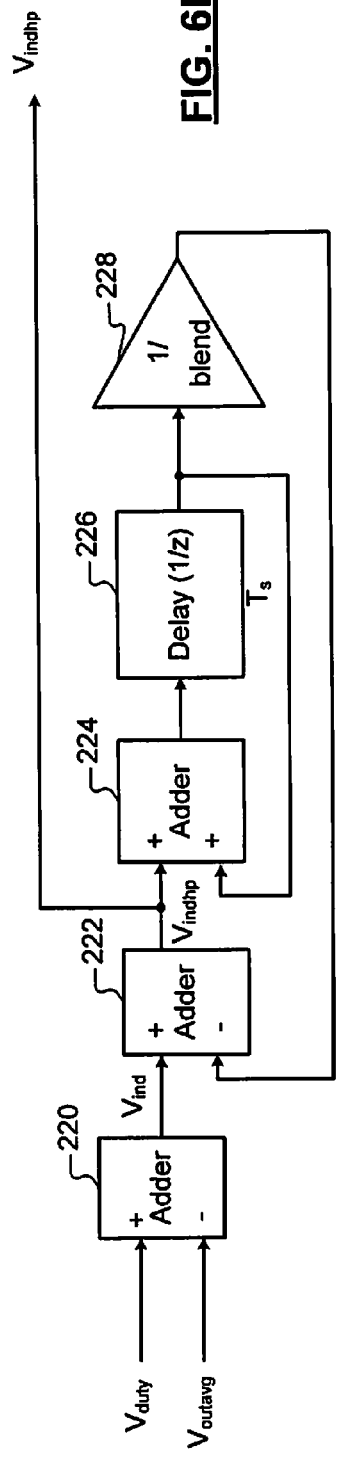
FIG. 6B
FIG. 6D
FIG. 6C

INDUCTOR CURRENT MEASUREMENT FOR DC TO DC CONVERTERS

FIELD

The present application is related to U.S. patent application Ser. No. 12/622,478 filed Nov. 20, 2009. The disclosure of the above application is incorporated herein by reference in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many analog and digital power supplies, including average current mode power supplies, include DC to DC converters. DC to DC converters can be of different types (e.g., Buck, boost, Buck-boost, fly-back, etc.). Buck type DC to DC converters include an inductor in an output stage. An output voltage of the DC to DC converter may be regulated in many ways. For example, in average current mode power supplies, current through the inductor (inductor current) may be used to regulate the output voltage. Accordingly, sensing the inductor current is an important function of a controller for high-efficiency DC to DC converters.

The sensed inductor current can be used in a variety of applications. For example, the applications may include over-current protection, adaptive voltage positioning, and loop control for current-mode power supplies. Additionally, the sensed inductor current can be used to determine when to switch from Continuous Conduction Mode (CCM) to Discontinuous Conduction Mode (DCM). Further, the sensed inductor current can be used to calculate load current in a state space based controller, where estimated capacitor current is available.

Methods for sensing the inductor current need to be accurate, low cost, and have minimum impact on the overall efficiency of a DC to DC converter. Several methods are currently used to sense the inductor current. Each of these methods, however, has some shortcomings that make these methods undesirable for a leading-edge, high-precision, and fast-transient DC to DC converter. Some of these methods are described below.

Referring now to FIG. 1, a converter 10 uses a high-precision resistance connected in series with the inductor to sense the inductor current. The converter 10 comprises a pulse-width modulation (PWM) controller 12, a pair of series-connected switches 14 and 16, an inductor L, a high-precision sensing resistor $R_{sense}$, a capacitor $C_{out}$, and an amplifier 20. $R_{dc}$ is a parasitic resistance of the inductor L.

The PWM controller 12 generates pulse-width modulated pulses that control on-off times of the switches 14 and 16. Current i flows through the inductor L and generates a voltage drop across the sensing resistor $R_{sense}$. The amplifier 20 has a gain of $A_v$ and amplifies the voltage drop across the sensing resistor $R_{sense}$. The output of the amplifier 20 is given by $i*R_{sense}*A_v$. The inductor current i can be determined from the output of the amplifier 20.

This method suffers from losses in the sensing resistor $R_{sense}$, which reduces the overall efficiency of the converter 10. Additionally, this method suffers from effects of noise since the voltage drop across the sensing resistor $R_{sense}$ used to sense the inductor current i is small. Further, the measurement circuits used to measure the inductor current i add a delay.

Instead of using the sensing resistor $R_{sense}$, an on-resistance ($R_{DSon}$) of the switches 14 and 16, can be used to sense the inductor current i. $R_{DSon}$ is a resistance between a drain and a source of a switch when the switch is on. When the switch is on, $R_{DSon}$ of the switch is in series with the inductor L, and the inductor current i generates a voltage drop across $R_{DSon}$ (i.e., $V_{DS}$), which can be measured to sense the inductor current i.

While this method does not affect the efficiency of the converter, this method is not very accurate since the value of $R_{DSon}$ varies based on temperature. Further, small signal levels of $V_{DS}$ pose noise problems. Additionally, measurement circuits used to measure the inductor current i add a delay.

Referring now to FIG. 2, a converter 30 uses a resistor and a capacitor connected in parallel to the inductor to sense the inductor current. The converter 30 comprises the PWM controller 12, the switches 14 and 16, the inductor L, and the capacitor $C_{out}$. Additionally, a resistor R and a capacitor C are connected across the inductor L as shown. $R_{DC}$, the parasitic resistance of the inductor L, serves as the sensing resistor.

The values of R and C are chosen so that the impedance of the RC circuit formed by the resistor R and the capacitor C matches the impedance of the inductor L. In other words, the values of R and C are chosen so that the time constant of the RC circuit matches the time constant of the LR circuit formed by the inductor L and the parasitic resistance $R_{DC}$. That is, the values of R and C are chosen so that $R*C \approx L/R_{DC}$.

When $R*C \approx L/R_{DC}$, the voltage across the capacitor C is linearly proportional to the inductor current i. The amplifier 40 amplifies the voltage across the capacitor C and generates an output equal to $i*R_{DC}*A_v$. The inductor current i can be determined from the output of the amplifier 40.

The accuracy of this approach depends on how closely the impedance of the RC circuit matches the impedance of the inductor L. Further, small voltage levels across the capacitor C pose noise problems. Particularly, the sensed inductor current may include high-frequency noise. Additionally, measurement circuits used to measure the inductor current i add a delay.

SUMMARY

A system comprises an averaging module, a high pass filter module, a first estimation module, a sensing module, and a combining module. The averaging module receives an output voltage of a power supply and that generates an average output voltage. The high pass filter module receives an average switching voltage used to control switches in an output stage of the power supply and filters a difference between the average output voltage and the average switching voltage. The estimation module estimates a first filtered current through an inductor in the output stage based on an output of the high pass filter module. The sensing module senses voltage across the inductor and estimates a second current through the inductor. The low pass filter module filters the second current. The combining module combines the first filtered current and the second filtered current to generate an estimated current through the inductor.

In other features, the high pass filter module includes a high pass filter having a first corner frequency. The low pass filter module includes a low pass filter having a second corner frequency. The first corner frequency is equal to the second corner frequency.

In other features, the high pass filter module includes a high pass filter having a first gain. The low pass filter module includes a low pass filter having a second gain. The first gain is equal to the second gain.

In other features, the high pass filter module includes a high pass filter having a first pole. The low pass filter module includes a low pass filter having a second pole. The first pole is equal to the second pole.

In another feature, the sensing module comprises a circuit connected across the inductor. An impedance of the circuit matches an impedance of the inductor.

In another feature, the estimation module estimates the first current through the inductor by using a model of the inductor.

In other features, the high pass filter module, the estimation module, the low pass filter module, and the combining module are implemented using at least one of passive and active analog components including resistances, capacitances, and operational amplifiers.

In other features, the high pass filter module, the estimation module, the low pass filter module, and the combining module are implemented using digital logic including adders, multipliers, and a delay stage.

In other features, the high pass filter module, the estimation module, the low pass filter module, and the combining module are implemented using firmware including instructions executable by a digital signal processor (DSP) controlling the converter.

In still other features, a method comprises generating an average output voltage by averaging an output voltage of a power supply. The method further comprises filtering using a high pass filter a difference between the average output voltage and an average switching voltage used to control switches in an output stage of the power supply. The method further comprises estimating a first filtered current through an inductor in the output stage based on an output of the high pass filter and estimating a second current through the inductor by sensing voltage across the inductor. The method further comprises filtering the second current using a low pass filter and combining the first filtered current and the second filtered current to generate an estimated current through the inductor.

In other features, the method further comprises configuring the high pass filter to have a first corner frequency and configuring the low pass filter to have a low pass filter having a second corner frequency, where the first corner frequency is equal to the second corner frequency.

In other features, the method further comprises configuring the high pass filter to have a first gain and configuring the low pass filter to have a low pass filter having a second gain, where the first gain is equal to the second gain.

In other features, the method further comprises configuring the high pass filter to have a first pole and configuring the low pass filter to have a low pass filter having a second pole, where the first pole is equal to the second pole.

In another feature, the method further comprises sensing the voltage across the inductor by using a circuit connected across the inductor, where an impedance of the circuit matches an impedance of the inductor.

In other features, the method further comprises generating a model of the inductor and estimating the first current through the inductor by using the model.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 6A-6D depict different implementations of a high pass filter module used in FIGS. 4 and 5;

DETAILED DESCRIPTION

Figure 1:
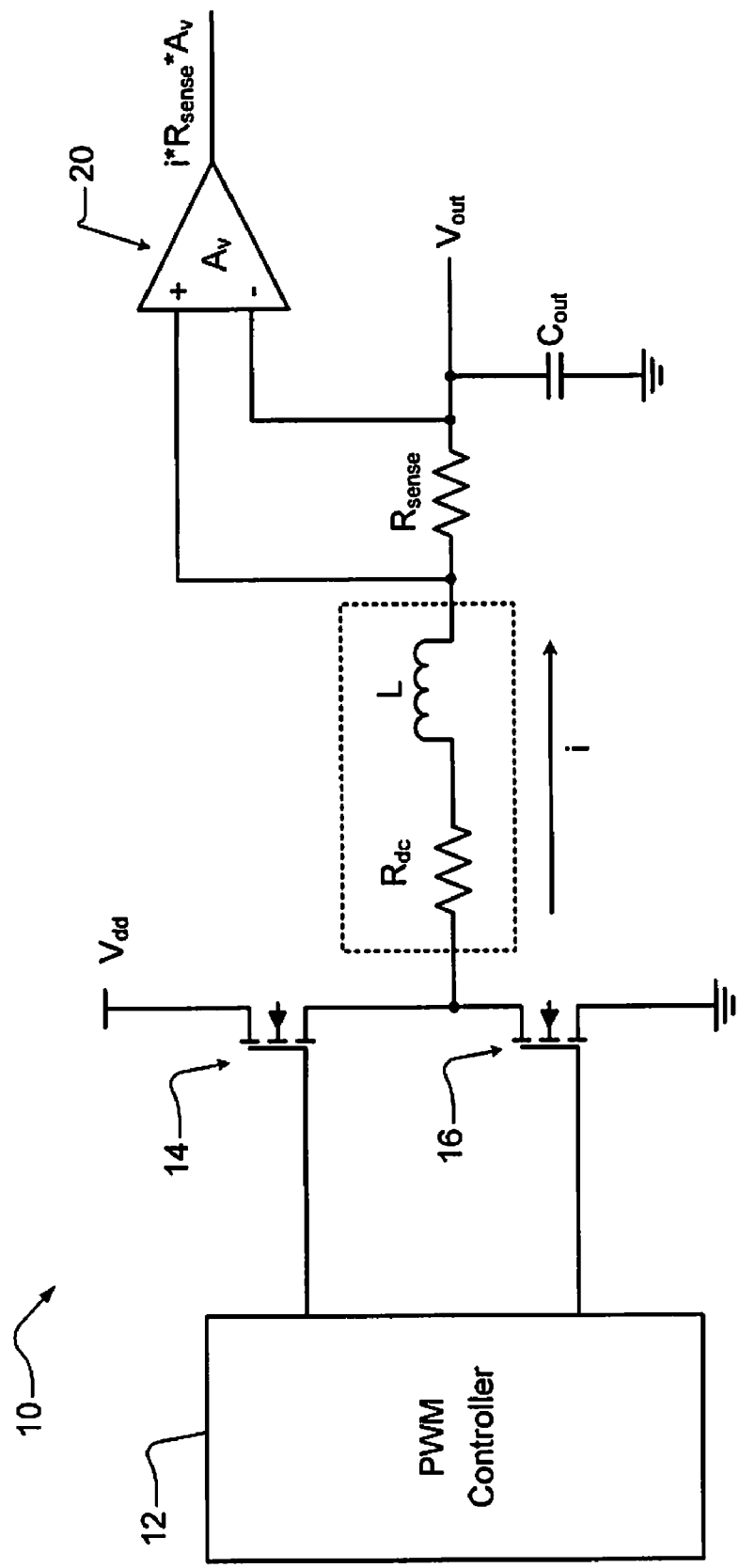
FIG. 1 depicts a DC to DC converter that uses a resistor connected in series with an inductor to sense an inductor current.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 3A:
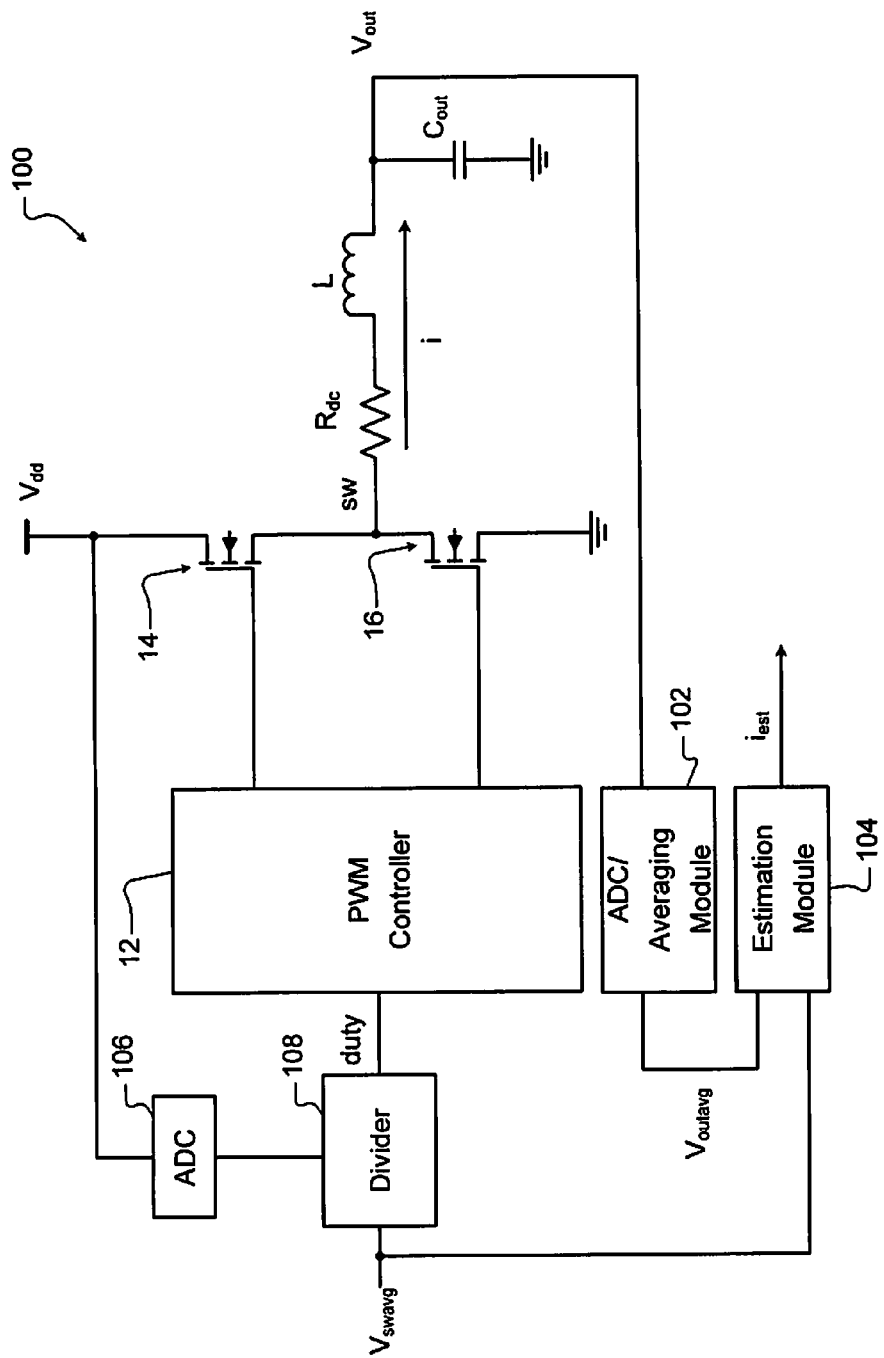
FIGS. 3A and 3B depict a system that uses a mathematical model to estimate an average inductor current.
Figure 3B:
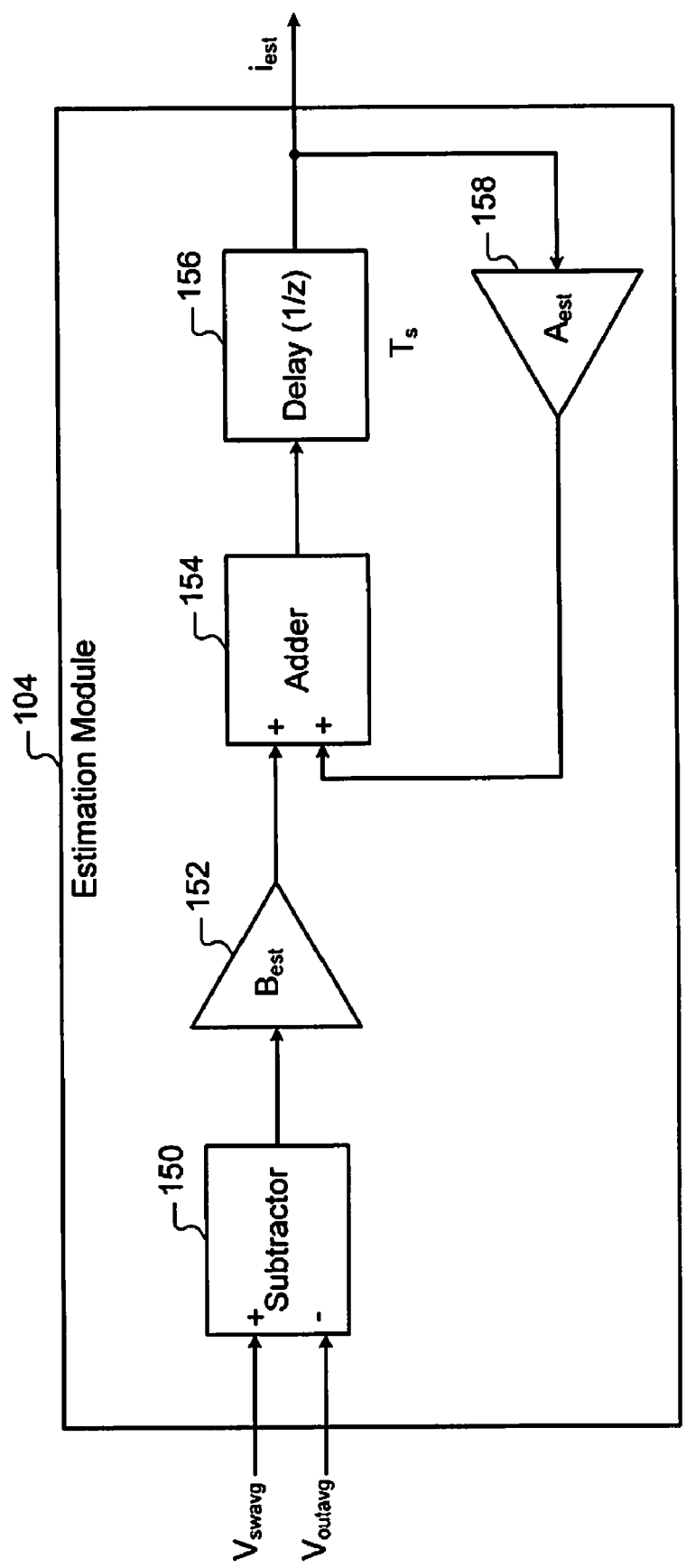

Referring now to FIGS. 3A and 3B, a system 100 uses a mathematical model to estimate an average inductor current. A detailed description of the mathematical model can be found in U.S. patent application Ser. No. 12/622,478 filed Nov. 20, 2009, which is incorporated herein by reference in its entirety. A brief description of the system 100 follows.

In FIG. 3A, the system 100 comprises the PWM controller 12, the switches 14 and 16, the inductor L, and the capacitor $C_{out}$. Additionally, the system 100 comprises an ADC/Averaging module 102, an estimation module 104, an ADC 106, and a divider 108. The ADC/Averaging module 102 digitizes an output voltage across the capacitor $C_{out}$ and generates average values of the output voltage ($V_{outavg}$). The ADC 106 digitizes an input voltage $V_{dd}$. The divider 108 divides an average switching voltage $V_{avgsw}$ by the input voltage $V_{dd}$. The average switching voltage $V_{avgsw}$ is the average voltage of the signal used to control duty cycle of the switches 14 and 16. The PWM controller 12 determines a duty cycle of the pulses that drive the switches 14 and 16 based on the ratio $V_{avgsw}/V_{dd}$.

The average switching voltage $V_{avgsw}$ and the average values of the output voltage are input to the estimation module 104. The estimation module 104 combines the average switching voltage $V_{avgsw}$ and the average values of the output voltage to estimate an average inductor current. The estimation module 104 uses the mathematical model summarized below to estimate the average inductor current $i_{est}$.

In FIG. 3B, the estimation module 104 is shown in detail. The estimation module comprises a subtractor 150, a multiplier 152, an adder 154, a delay stage 156, and a multiplier 158. The subtractor 150 generates a difference between the average switching voltage $V_{avgsw}$ and the average values of the output voltage. The multiplier 152 multiples the output of the subtractor 150. The adder 154 adds the output of the multiplier 152 and an output of the multiplier 158. The delay stage 156 delays an output of the adder 154. The multiplier 158 multiplies the output of the delay stage 156. The output of the delay stage 156 is the estimated inductor current $I_{est}$.

Mathematically, an instantaneous inductor current is given by the following equation:

$$L \frac{di(t)}{dt} = Vsw(t) - R*i(t) - vout(t)$$

When averaged over a PWM cycle, the equation reduces to:

$$L \frac{1}{T} \frac{d}{dt} \int_0^T i(t)\,dt = \frac{1}{T}\int_0^T Vsw(t)\,dt - R\frac{1}{T}\int_0^T i(t)\,dt - \frac{1}{T}\int_0^T vout(t)\,dt$$

Using the definition of averaging over one period, the equation simplifies to:

$$L \frac{d\,avgi(t)}{dt} = Vavgsw(t) - R*avgi(t) - vout(t)$$

where $V_{avgsw}$ is the average switching voltage, avgi is the average inductor current, vout is the measured or estimated output voltage, L is the inductance of the inductor L, and R is the DC resistance of the power stage.

These differential equations may be simplified to a discrete time equation of the form:

$$avgi(n+1) = A_{est}*avgi(n) + B_{est}*(V_{avgsw}(n) - vest(n)),$$

where $A_{est}$ and $B_{est}$ are multipliers, n denotes a current sampling time, and (n+1) denotes a subsequent sampling time. Typically, since the time constant of the inductor L (L/R) is much larger than a sampling time $T_s$, $A_{est}$ and $B_{est}$ can be approximated as $B_{est} = T_s/L$, and $A_{est} = 1 - R*T_s/L$.

The above method estimates the average inductor current using the mathematical model of the inductor and the DC resistance of the power stage. This method does not have noise problems since this method uses the mathematical model instead of relying on noise sensitive measurements. This method, however, estimates the average inductor current based on the duty cycle (since $V_{avgsw}$ is proportional to the duty cycle) and the output voltage. Accordingly, this method has problems with DC offset due to errors in the duty cycle.

The present disclosure relates to generating a composite estimate of inductor current using a combination of two methods: the method that uses impedance matched circuit to sense the inductor current, and the method that uses the mathematical model to estimate the inductor current. The DC offset problem associated with the method that uses the mathematical model is eliminated by filtering the input to the estimation module with a high-pass filter. The high-frequency noise problem associated with the method that uses the impedance matched circuit is eliminated by filtering the sensed inductor current with a low-pass filter. The outputs of the estimation module and the low-pass filter are combined to generate a composite estimate inductor current that is free of the DC offset and the high-frequency noise.

Thus, the present disclosure provides a method for sensing the inductor current without noise problems and with no impact on the overall efficiency of the converter. The method of generating the composite estimate of inductor current disclosed herein blends the advantages of no loss and low cost of the impedance matching method with the noise-free current estimate generated by the mathematical modeling method. Accordingly, the method disclosed herein produces a high bandwidth, low noise, and accurate estimate of the inductor current at low cost. The method disclosed herein can be implemented using analog hardware, digital hardware, firmware, or a combination thereof.

Figure 4:
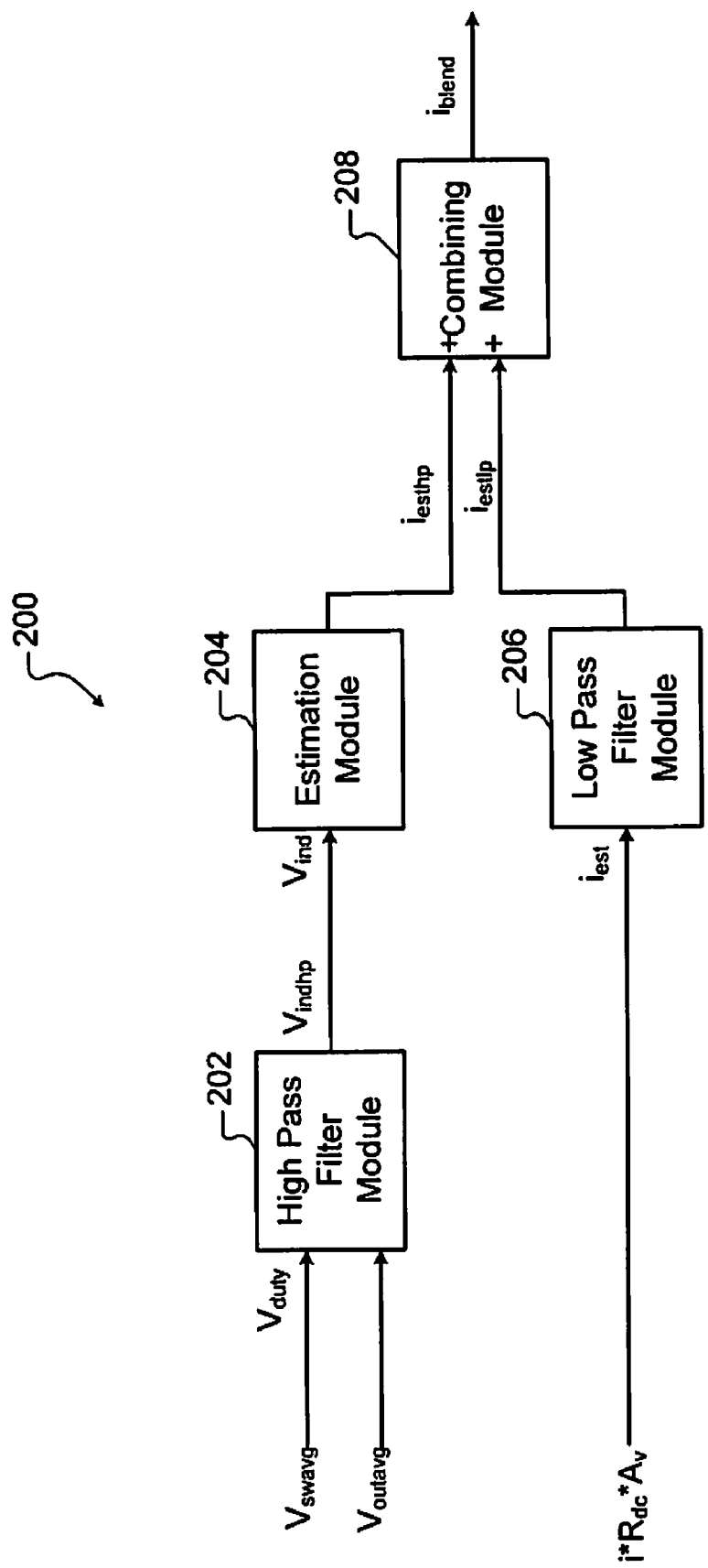
FIG. 4 is a functional block diagram of a system for sensing an inductor current according to the present disclosure.

Referring now to FIG. 4, a functional block diagram of a system 200 for sensing the inductor current according to the present disclosure is shown. The system 200 comprises a high pass filter module 202, an estimation module 204, a low pass filter module 206, and a combining module 208. The high pass filter module 202 includes a high pass filter. The low pass filter module 206 includes a low pass filter. The high pass filter and the low pass filter have the same corner frequency (i.e., 3 dB cutoff frequency) and the same gain.

The corner frequency and the gain of the high pass filter and the low pass filter can be selected by a user. For example, the user may communicate with the controller using power management bus (PMbus) commands or graphical user interface (GUI) commands to select the corner frequency and the gain.

The high pass filter module 202 receives the average output voltage of the converter ($V_{outavg}$) and the average switching voltage $V_{avgsw}$, which is available from the controller that controls the converter. The average switching voltage $V_{avgsw}$ is proportional to the duty cycle. Accordingly, the average switching voltage $V_{avgsw}$ can also be referred to as $V_{duty}$ (i.e., the duty cycle voltage). The high pass filter module 202 filters $V_{avgsw}$ and $V_{outavg}$. The output of the high pass filter module 202, $V_{indhp}$, is free of the DC offset. $V_{indhp}$ is input to the estimation module 204. The estimation module 204 uses the mathematical model described above to estimate the inductor current and generates the estimated inductor current $i_{esthp}$ that is free of DC offset.

Figure 2:
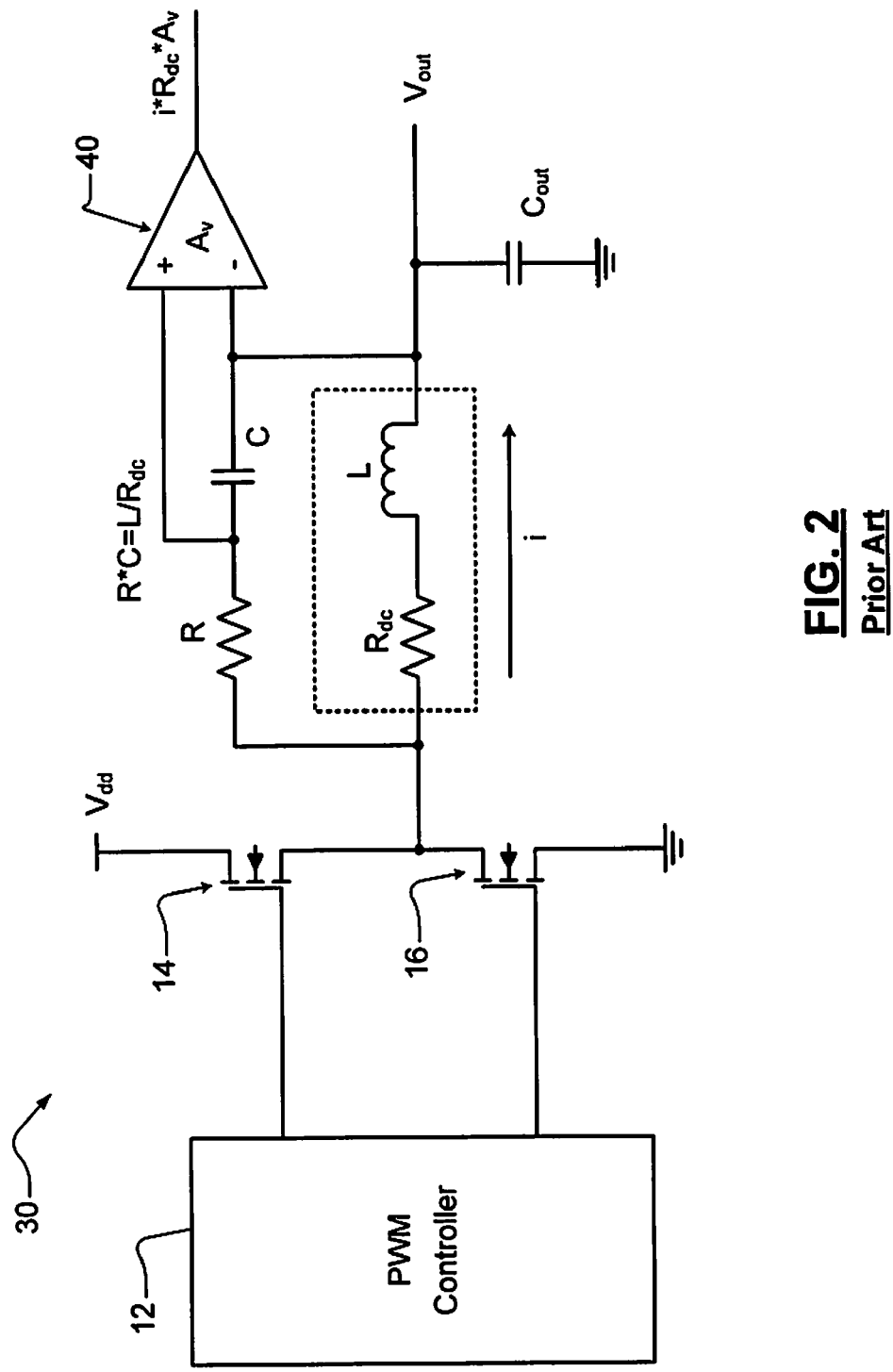
FIG. 2 depicts a DC to DC converter that uses a resistor and a capacitor connected in parallel to an inductor to sense an inductor current.

The low pass filter module 206 filters the inductor current $i_{est}$ sensed using the impedance matching method described above (see description of FIG. 2). The low pass filter module 206 removes the high-frequency noise from the sensed inductor current $i_{est}$ and outputs $i_{estlp}$, which is free of the high-frequency noise. The combining module 208 combines the output of the estimation module 204, $i_{esthp}$, and the output of the low pass filter module 206, $i_{estlp}$, to generate a blended inductor current $i_{blend}$ that is free of the DC offset and the high-frequency noise.

Figure 5:
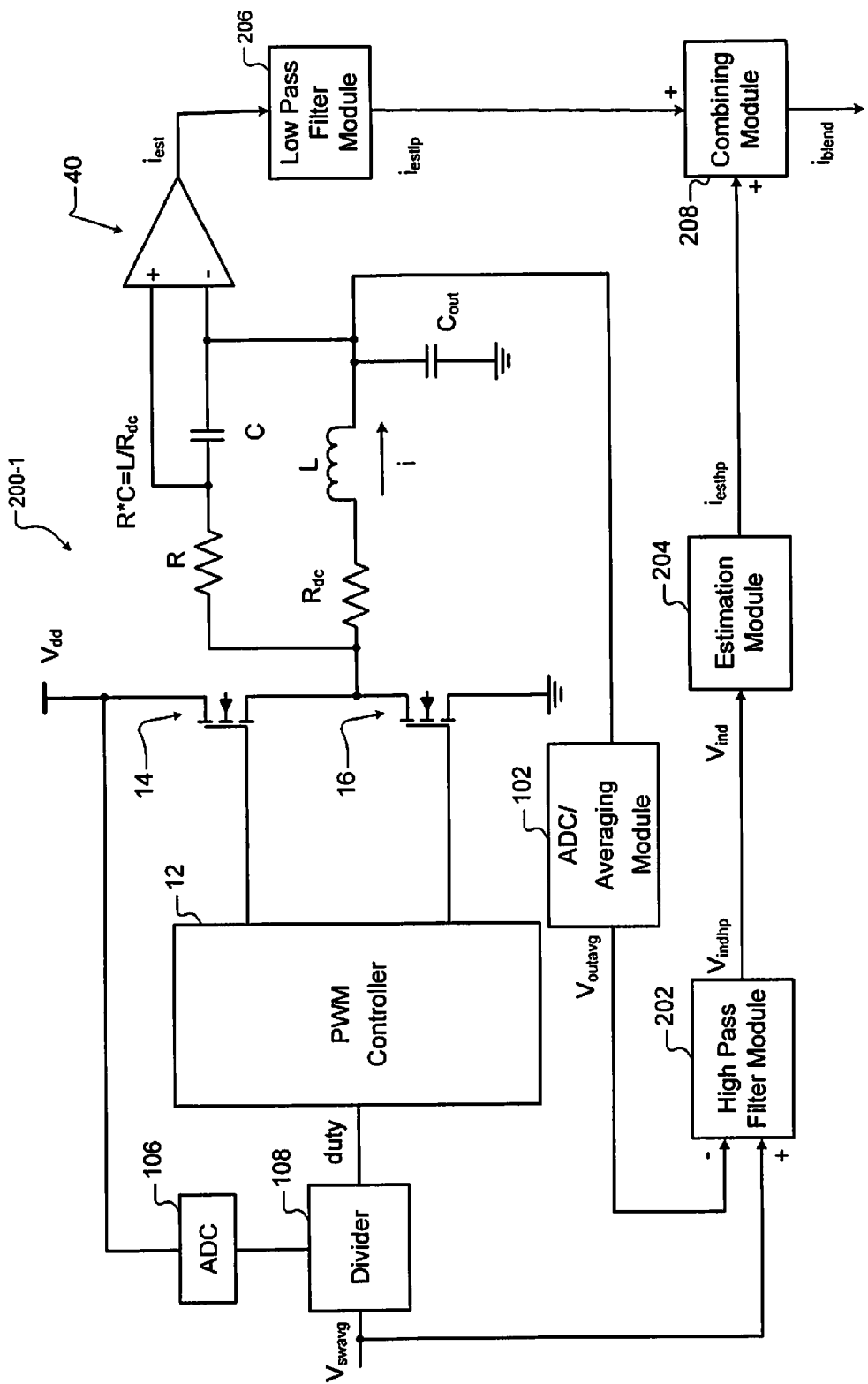
FIG. 5 is a detailed functional block diagram of a system for sensing an inductor current according to the present disclosure.

Referring now to FIG. 5, a system 200-1 is shown. The system 200-1 comprises the converter 30 shown in FIG. 2, the system 100 shown in FIGS. 3A and 3B, and the system 200 shown in FIG. 4. The operation of the converter 30, the system 100, and the system 200 is described above and is not repeated.

Figure 7:
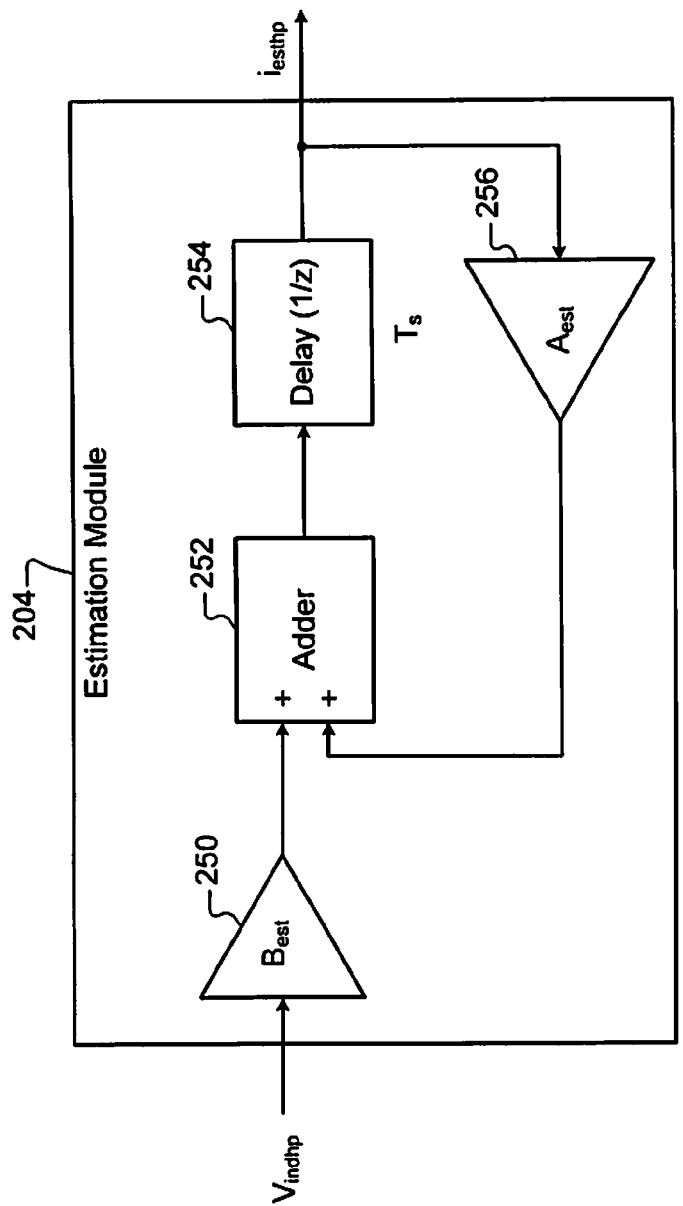
FIG. 7 is a functional block diagram of an estimation module used in FIGS. 4 and 5.

Referring now to FIGS. 6A-8D, different implementations (e.g., analog, digital, and firmware implementations) of each module of the system 200 are shown. In FIGS. 6A-6D, different implementations of the high pass filter module 202 are shown. In FIG. 7, a digital implementation of the estimation module 204 is shown. In FIGS. 8A-8D, different implementations of the low pass filter module 206 are shown.

In FIG. 6A, a discrete high pass filter (e.g., a first order high pass digital filter) is shown, where α is the pole of the high pass filter in Z domain. In FIG. 6B, a digital implementation of the discrete high pass filter comprising adders, a delay stage, and a gain stage is shown. Adders 220, 222, and 224 represent summing junctions. A delay stage 226 adds a delay denoted by 1/z. A gain stage 228 is implemented using a multiplier, where blend (i.e., gain)=1/(1−α).

The high pass filter module 202 can be implemented by firmware in a digital signal processor (DSP) based power controller. The firmware may include code for the following equations:

$$V_{ind} = V_{duty}(n) - V_{out}(n), \text{ and}$$

$$V_{indhp} = V_{ind}(n) + V_{indhp} * (1 - 1/\text{blend}) - V_{ind}(n-1),$$

where n denotes a current sampling time, and (n−1) denotes a previous sampling time. Substituting blend=1/(1−α), the equation for $V_{indhp}$ becomes $$V_{indhp} = V_{ind}(n) + V_{indhp} * \alpha - V_{ind}(n-1).$$

In FIGS. 6C and 6D, analog implementations of the high pass filter are shown. In FIG. 6C, an analog high pass filter implemented using passive components (an RC circuit) is shown. The corner frequency of the high pass filter is given by $f_c = 1/2\pi RC$. In FIG. 6D, an analog high pass filter implemented using active components is shown. The corner frequency of the high pass filter is given by $f_c = 1/2\pi R_1 C$. The high-frequency signals are inverted and amplified by $R_2/R_1$. Accordingly, the gain of the high pass filter is $(-R_2/R_1)$.

In FIG. 7, the estimation module 204 comprises a multiplier 250, an adder 252, a delay stage 254, and a multiplier 256. The input to the estimation module is the output $V_{indhp}$ of the high pass filter module 202, which is free of the DC offset. The multiplier 250 multiples $V_{indhp}$. The adder 252 adds the output of the multiplier 250 and an output of the multiplier 256. The delay stage 254 delays an output of the adder 252. The multiplier 256 multiplies the output of the delay stage 254. The output of the delay stage 254 is the estimated inductor current $i_{esthp}$, which is free of the DC offset. Typically, since the time constant of the inductor L (L/R) is much larger than the sampling time $T_s$, $A_{est}$ and $B_{est}$ can be approximated as $B_{est} = T_s/L$, and $A_{est} = 1 - R_{dc} * T_s/L$.

The estimation module 204 can be implemented by firmware in a DSP based power controller. The firmware may include code for the following equation:

$$i_{est}(n+1) = A_{est} * i_{est}(n) + B_{est} * V_{indhp}(n),$$

where n denotes a current sampling time, and (n+1) denotes a subsequent sampling time.

Figure 8A:
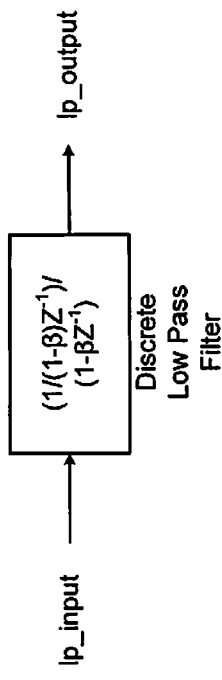
FIGS. 8A-8D depict different implementations of a low pass filter module used in FIGS. 4 and 5.
Figure 8B:
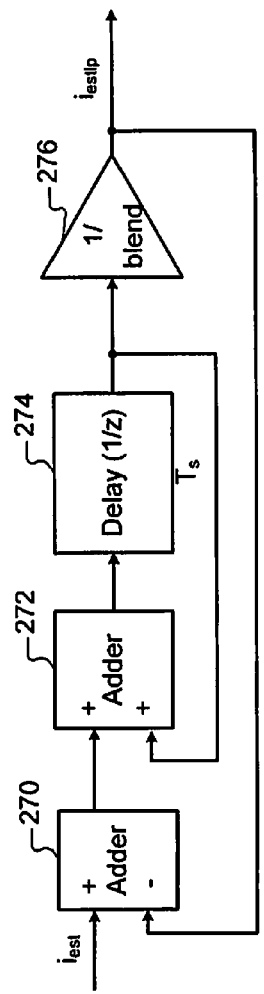

In FIG. 8A, a discrete low pass filter (e.g., a first order high pass digital filter) is shown, where β is the pole of the low pass filter in Z domain. In FIG. 8B, a digital implementation of the discrete low pass filter comprising adders, a delay stage, and a gain stage is shown. Adders 270 and 272 represent summing junctions. A delay stage 274 adds a delay denoted by 1/z. A gain stage 276 is implemented using a multiplier, where β=1/(1−blend).

The low pass filter module 206 can be implemented by firmware in a DSP based power controller. The firmware may include code for the following equation:

$$i_{estlp}(n) = \text{blend} * i_{est}(n-1) + (1 - 1/\text{blend}) * i_{estlp}(n-1).$$

where n denotes a current sampling time, and (n−1) denotes a previous sampling time. Alternatively, $$i_{estlp}(n) = \beta * i_{est}(n-1) + (1 - 1/\beta) * i_{estlp}(n-1).$$

Figure 8D:
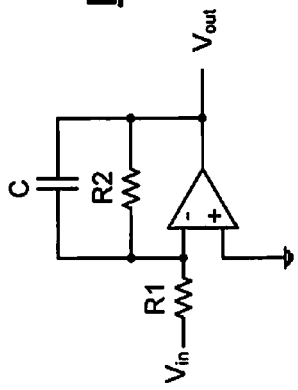
Figure 8C:
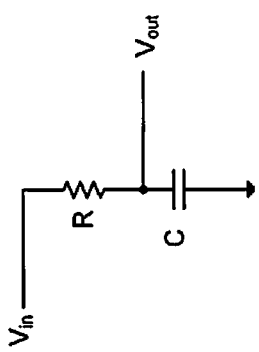

In FIGS. 8C and 8D, analog implementations of the low pass filter are shown. In FIG. 6C, an analog low pass filter implemented using passive components (an RC circuit) is shown. The corner frequency of the low pass filter is given by $f_c = 1/2\pi RC$. In FIG. 8D, an analog low pass filter implemented using active components is shown. The corner frequency of the low pass filter is given by $f_c = 1/2\pi R_2 C$. The gain of the low pass filter is $(-R_2/R_1)$.

The combining module 208 combines the output of the estimation module 204, $i_{esthp}$, and the output of the low pass filter module 206, $i_{estlp}$, to generate the composite estimate of inductor current, $i_{blend}$, which is given by the following equation:

$$i_{blend} = i_{esthp} + i_{estlp}.$$

The pole of the low pass filter module 206 is the same as the pole of the high pass filter module 202. Accordingly, the composite estimate of inductor current $i_{blend}$ has no DC offset and high frequency noise and has high bandwidth, high precision, and low noise.

Figure 9A:
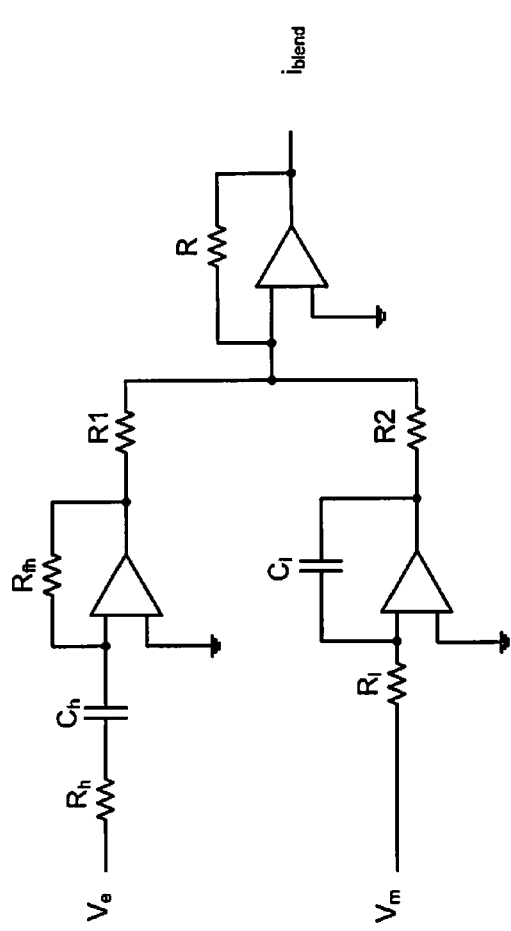
FIG. 9A is an analog implementation of the system of FIG. 4.

Referring now to FIG. 9A, an analog implementation of the system 200 is shown. In FIG. 9A, the subscript 'h' in a component symbol indicates that the component is part of a high pass filter, and the subscript 'l' in a component symbol indicates that the component is part of a low pass filter. $V_e$ represents an estimated current input to a high pass filter. $V_m$ represents a measured current input to a low pass filter. Output $i_{blend}$ a blend of the estimated current $V_e$ and the measured current $V_m$ and is given by the following equation:

$$i_{blend} = (R/R1) * (R_{fh} * C_h * s)/(R_{fh} * C_h * s + 1) + (R/R2) * (R_l/R_l * C_l * s + 1),$$

is a Laplace transform variable. Values of resistances and capacitances shown in FIG. 9a are selected so that the above equation is satisfied.

Figure 9B:
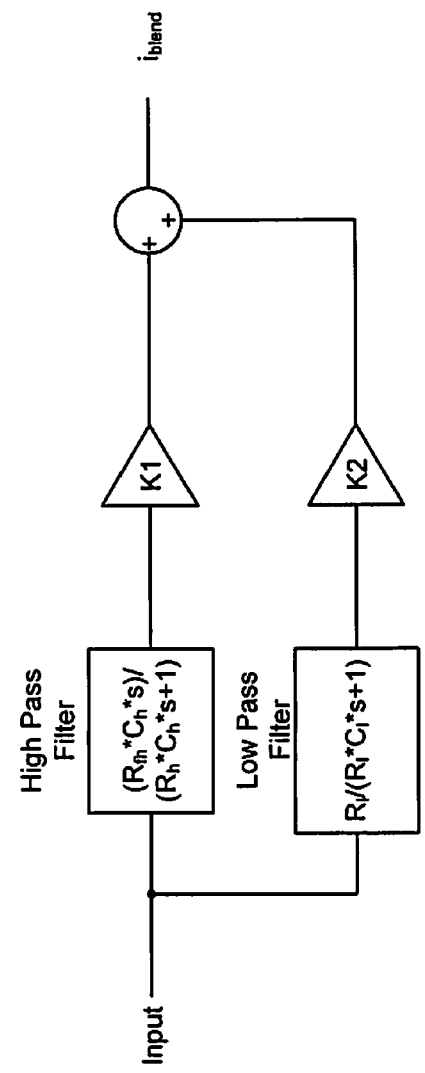
FIG. 9B is a simulated representation of the analog implantation shown in FIG. 9A.

Referring now to FIG. 9B, a simulated representation of the analog implantation is shown. K1=R/R1, and K2=R/R2.

Figure 10:
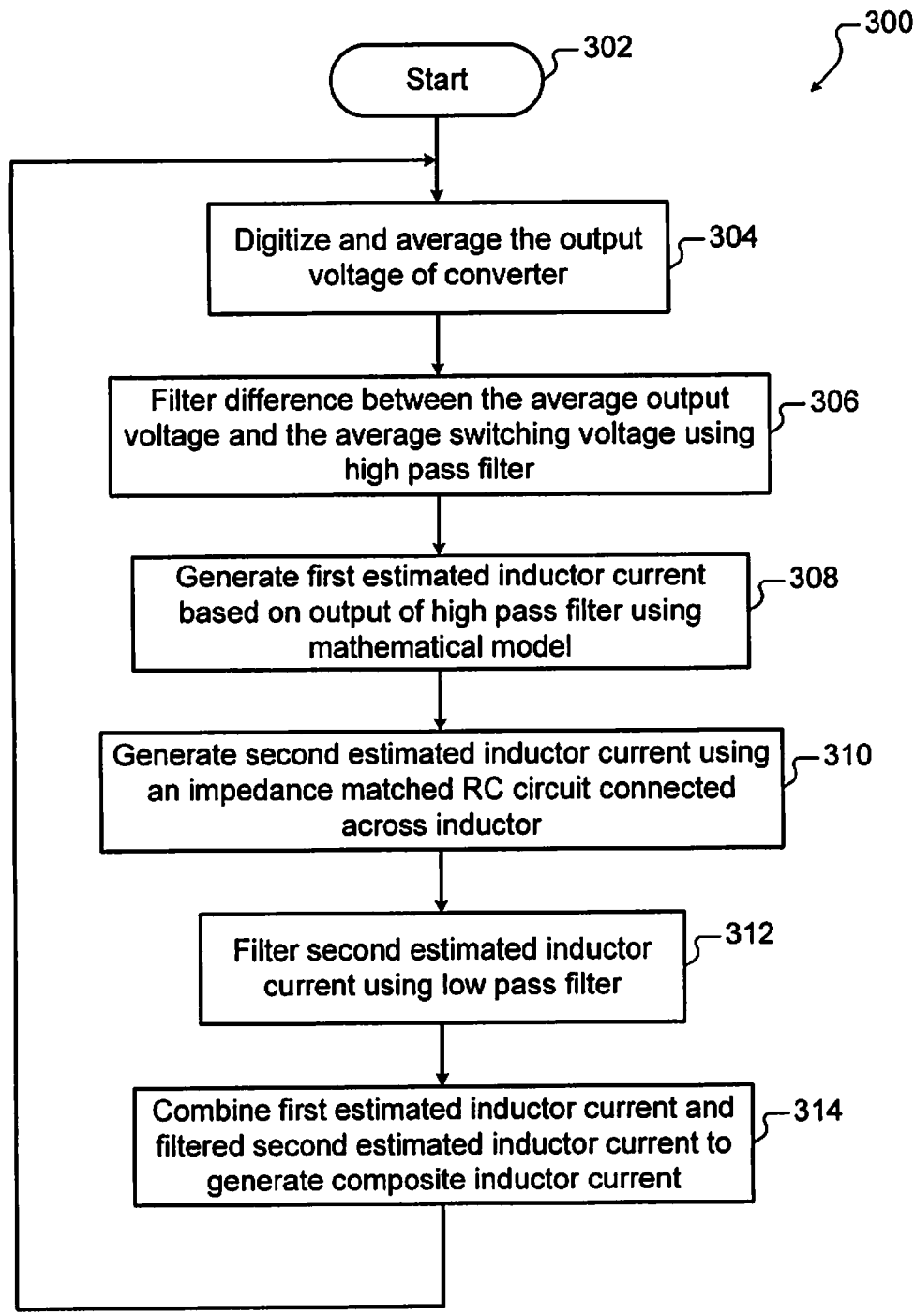
FIG. 10 is a flowchart of a method for sensing an inductor current according to the present disclosure.

Referring now to FIG. 10, a method 300 for estimating inductor current according to the present disclosure is shown. Control begins at 302. At 304, control digitizes and averages the output voltage of the converter. At 306, control filters the difference between the average output voltage and the average switching voltage using high pass filter and removes DC offset. At 308, control generates a first estimated inductor current using a mathematical model of the inductor and the DC resistance of the output stage of the converter.

At 310, control generates a second estimated inductor current from the inductor voltage sensed using an impedance-matched RC circuit connected across the inductor. At 312, control filters the second estimated inductor current using a low pass filter and removes high-frequency noise. At 314, control combines the first estimated inductor current and the filtered second estimated inductor current to produce the composite estimate of inductor current, which has no DC offset and high-frequency noise. Control returns to 304.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
an averaging module that receives an output voltage of a power supply and that generates an average output voltage;
a high pass filter module that receives an average switching voltage used to control switches in an output stage of the power supply and that filters a difference between the average output voltage and the average switching voltage;
an estimation module that estimates a first filtered current through an inductor in the output stage based on an output of the high pass filter module;
a sensing module that senses voltage across the inductor and that estimates a second current through the inductor;
a low pass filter module that filters the second current; and
a combining module that combines the first filtered current and the second filtered current to generate an estimated current through the inductor.

2. The system of claim 1 wherein:
the high pass filter module includes a high pass filter having a first corner frequency;
the low pass filter module includes a low pass filter having a second corner frequency; and
the first corner frequency is equal to the second corner frequency.

3. The system of claim 1 wherein:
the high pass filter module includes a high pass filter having a first gain;
the low pass filter module includes a low pass filter having a second gain; and
the first gain is equal to the second gain.

4. The system of claim 1 wherein:
the high pass filter module includes a high pass filter having a first pole;
the low pass filter module includes a low pass filter having a second pole; and
the first pole is equal to the second pole.

5. The system of claim 1 wherein the sensing module comprises a circuit connected across the inductor, and wherein an impedance of the circuit matches an impedance of the inductor.

6. The system of claim 1 wherein the estimation module estimates the first current through the inductor by using a model of the inductor.

7. The system of claim 1 wherein the high pass filter module, the estimation module, the low pass filter module, and the combining module are implemented using at least one of passive and active analog components including resistances, capacitances, and operational amplifiers.

8. The system of claim 1 wherein the high pass filter module, the estimation module, the low pass filter module, and the combining module are implemented using digital logic including adders, multipliers, and a delay stage.

9. The system of claim 1 wherein the high pass filter module, the estimation module, the low pass filter module, and the combining module are implemented using firmware including instructions executable by a digital signal processor (DSP) controlling the converter.

10. A method comprising:
generating an average output voltage by averaging an output voltage of a power supply;
filtering using a high pass filter a difference between the average output voltage and an average switching voltage used to control switches in an output stage of the power supply;
estimating a first filtered current through an inductor in the output stage based on an output of the high pass filter;
estimating a second current through the inductor by sensing voltage across the inductor;
filtering the second current using a low pass filter; and
combining the first filtered current and the second filtered current to generate an estimated current through the inductor.

11. The method of claim 10 further comprising:
configuring the high pass filter to have a first corner frequency; and
configuring the low pass filter to have a low pass filter having a second corner frequency,
wherein the first corner frequency is equal to the second corner frequency.

12. The method of claim 10 further comprising:
configuring the high pass filter to have a first gain; and
configuring the low pass filter to have a low pass filter having a second gain,
wherein the first gain is equal to the second gain.

13. The method of claim 10 further comprising:
configuring the high pass filter to have a first pole; and
configuring the low pass filter to have a low pass filter having a second pole,
wherein the first pole is equal to the second pole.

14. The method of claim 10 further comprising sensing the voltage across the inductor by using a circuit connected across the inductor, wherein an impedance of the circuit matches an impedance of the inductor.

15. The method of claim 10 further comprising:
generating a model of the inductor; and
estimating the first current through the inductor by using the model.

* * * * *